Figure 1:
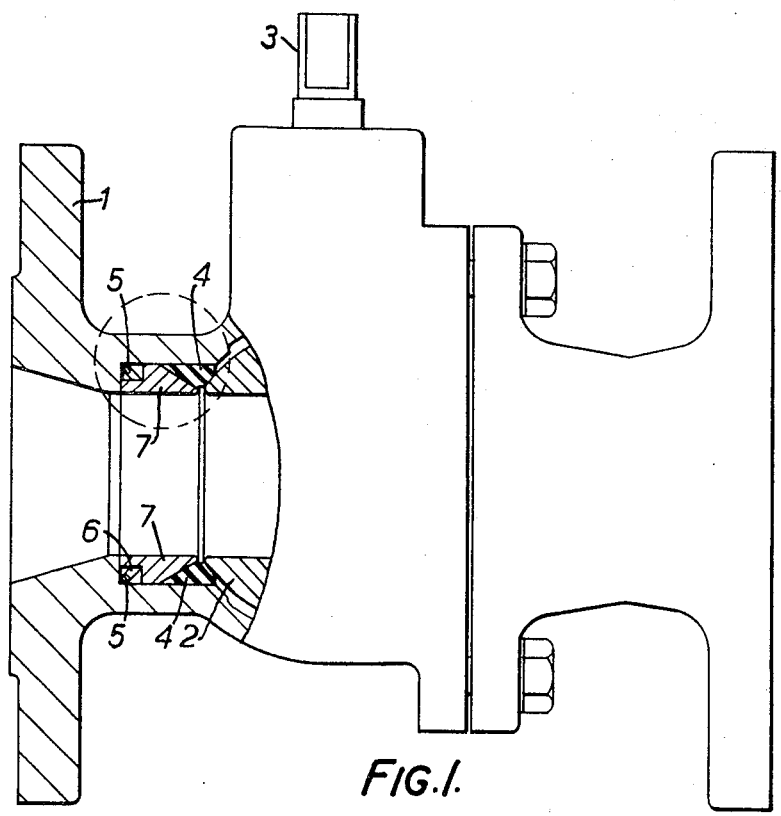

United States Patent [19]
Jones et al.

[11] 3,719,344
[45] March 6, 1973

[54] BALL VALVE SEATING ASSEMBLIES

[75] Inventors: Gerald Cedric Jones, Hereford; Herbert Bentley Leek, Upper Doluington, Hereford, both of England

[73] Assignee: Saunders Valve Company Limited, Moumonthshire, England

[22] Filed: Aug. 16, 1971

[21] Appl. No.: 171,898

[30] Foreign Application Priority Data

Aug. 26, 1970 Great Britain..................41,010/70

[52] U.S. Cl....................251/174, 251/315, 251/317
[51] Int. Cl.............................................F16k 11/04
[58] Field of Search.............251/174, 315, 316, 317

[56] References Cited

UNITED STATES PATENTS

| | | | |
|---|---|---|---|
| 3,387,815 | 6/1968 | Richards | 251/174 |
| 3,563,511 | 2/1971 | Leek | 251/315 X |
| 3,604,682 | 9/1971 | Richards | 251/174 |

*Primary Examiner*—Harold W. Weakley
*Attorney*—Arthur H. Seidel et al.

[57] ABSTRACT

A ball valve of the type having a ball with a flow passage therethrough rotatably mounted in a bore in a valve casing in engagement with seating rings of extrudable material disposed on opposite sides of the ball and urged into sealing contact with the ball by spring-urged backing rings having conical surfaces confronting similar conical surfaces of the seating rings wherein the confronting conical surfaces of at least one of the co-operating backing and sealing ring pairs are so shaped as to be separated over a major part of their axial extent by a gap which tapers in a direction away from the ball.

4 Claims, 2 Drawing Figures

PATENTED MAR 6 1973          3,719,344

BALL VALVE SEATING ASSEMBLIES

This invention concerns ball valves of the type wherein a seal between the rotatable ball and the valve housing is provided by a seating ring and backing ring assembly.

When a seating ring of this type is in position within a valve its outer cylindrical surface is supported by intimate contact with the inner surface of the port in which it is located, its conical rear surface is supported by the mating surface of the backing ring which serves to urge the seating ring into contact with the ball, and its shaped ball-engaging forward face is firmly supported by the ball surface thus leaving unsupported only two relatively minor surface areas, one extending between the ball and backing ring and facing into the bore and the other extending between the ball and the port and facing outwardly into the housing portion above the ball. When such a seating ring is subjected to high pressure due, for example, to differential expansion of the material of the seating ring and the material or materials of the ball, housing, and backing ring under high temperature conditions, there is a tendency for the material of the seating ring to be extruded at one or other of its unsupported faces into either the gap between the ball and port or the gap between the ball and backing ring. Extrusion between the ball and port is particularly undesirable and it is the object of the invention to overcome this difficulty.

To this end the relative shaping of the co-operating surfaces of the backing ring and seating ring is modified to provide a gap which tapers in the direction away from the ball over two thirds or as much as three quarters of the axial extent of these co-operating surfaces. Under conditions of high pressure the material of the seating ring distorts to fill this tapered gap instead of being extruded as above described.

One way of achieving this modification is to form the backing ring and seating ring conical surfaces with a mis-match of about 5° and then crush the seat until the conical surfaces are in direct contact over about one quarter or one third of the axial length thereof. Alternatively either the backing ring or the seating ring can be formed with its thrust surface conical at two different angles to give the 5° mis-match over two thirds or three quarters of the axial length as before.

Figure 2:
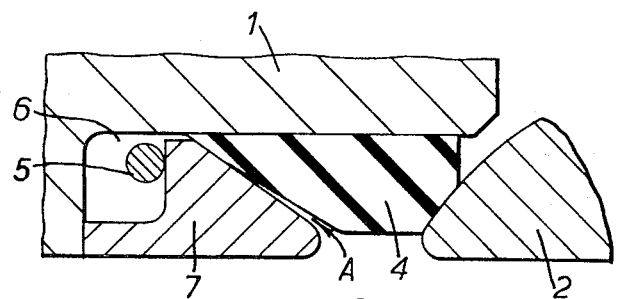

A preferred embodiment of the invention will now be described with reference to the accompanying drawings of which:

FIG. 1 is a view, partly in section, of a ball valve of the known type to which the invention can be applied and FIG. 2 is a sectional view to an enlarged scale of the portion of the valve shown outlined in a circle in FIG. 1 with the invention applied thereto.

The ball valve shown in section in FIG. 1 comprises a casing 1 in which is located a spherical plug or ball 2 which is arranged to be rotated between open and closed positions of the valve from the exterior of the casing 1 by an operating shaft 3. The casing is shown broken away to disclose the location of one of a pair of seating rings 4 disposed on opposite sides of the ball 2. The ring 4 is resiliently urged into sealing engagement with the spherical outer surface of the ball 2 by a series of coil springs 5 acting between a shoulder 6 in the casing, formed by a counterbore of larger diameter than the main bore through the casing 1, and a metal thrust ring 7 of frusto-conical form which extends into the countersink of the seating ring 4.

FIG. 2 shows that portion of FIG. 1 outlined in a circle to a larger scale with the seating ring 4 and backing ring 7 modified in shape in accordance with the invention in such a manner that the confronting conical surfaces of the backing ring 7 and of the seating ring 4 are separated over a major part of their axial extent by a tapered gap A. This gap tapers in a direction away from the ball 2 and has a taper angle of approximately 5°.

We claim:

1. A ball valve of the type having a ball with a flow passage therethrough rotatably mounted in a bore in a valve casing in engagement with seating rings of extrudable material disposed on opposite sides of the ball and urged into sealing contact with the ball by spring-urged backing rings having conical surfaces confronting similar conical surfaces of the seating rings wherein the confronting conical surfaces of at least one of the co-operating backing and sealing ring pairs are so shaped as to be separated over a major part of their axial extent by a gap which tapers in a direction away from the ball.

2. A ball valve as claimed in claim 1 wherein the angle of taper of said gap is approximately 5°.

3. A ball valve as claimed in claim 1 wherein the gap extends over two thirds the axial extent of the co-operating surfaces.

4. A ball valve as claimed in claim 2 wherein the gap extends over two thirds the axial extent of the co-operating surfaces.

* * * * *